April 21, 1964     J. H. KUCK     3,130,402
MEANS FOR TRACKING MULTIPLE TARGET FORMATIONS BY RADAR
Filed Feb. 12, 1957     5 Sheets-Sheet 1

FIG. 1.

INVENTOR
JOHN H. KUCK
BY
ATTORNEYS

April 21, 1964   J. H. KUCK   3,130,402
MEANS FOR TRACKING MULTIPLE TARGET FORMATIONS BY RADAR
Filed Feb. 12, 1957   5 Sheets-Sheet 2

JOHN H. KUCK
INVENTOR

BY
ATTORNEYS

JOHN H. KUCK
INVENTOR

FIG. 9.

United States Patent Office 3,130,402
Patented Apr. 21, 1964

3,130,402
MEANS FOR TRACKING MULTIPLE TARGET FORMATIONS BY RADAR
John H. Kuck, Silver Spring, Md., assignor to the United States of America as represented by the Secretary of the Navy
Filed Feb. 12, 1957, Ser. No. 639,839
13 Claims. (Cl. 343—7.4)

The present invention relates to radar apparatus. More particularly it relates to radars generally similar to prior simultaneous lobe comparison type radars having improved ability to track single targets in multiple formations.

Simultaneous lobe comparison or "monopulse" radars afford improved tracking of single targets when compared with conical scanning radars since the error voltages developed in monopulse radars are little influenced by signal amplitude fluctuations. However, all prior types of radars become almost hopelessly confused when facing two or more targets in fairly closely spaced formation.

The confusion of prior radars results from random variations in the reflectivity of the various targets in view. The behavior of the radars under these circumstances is logical and may be briefly explained. For example, assume that the radar was faced by a pair of targets spaced less than a beam width apart and located one to the left and one to the right of the radar tracking axis. If the targets were equally strong reflectors, the radar would be confused as to whether to turn left or right. But rather, since the targets twinkle, one being a stronger reflector momentarily than the other, the radar would probably wander from one target to the other. In either event, the radar will be in error in its pointing, and it is assumed that one of the most effective countermeasures for aircraft to employ against radar guided missiles would be to fly in formations of the type described.

However, a means of combating multiple target confusion is partially apparent. At times, one of the targets will appear as a strong signal while the other will be quite weak. If the most extreme target were selected during a moment of strong reflection and the other targets ignored, then the radar would point to an outer target in the formation, thus assuring that the radar pointing would be accurate with respect to at least one target in the formation.

The method of this invention involves the tracking of one edge or extremity of a target formation rather than attempting to follow an individual target in the presence of confusing signals as with prior radars. Of course, as the aircraft maneuver within the formation, the outer or extreme target may not always be constituted by the same aircraft, but at least the radar will point to a location containing real substance to be damaged.

It is therefore an object of the present invention to provide a radar capable of locating a single target in the presence of confusing formations of targets.

Another object of the present invention is to provide a radar capable of defining the outer extremities of a multiple target formation.

A further object of the present invention is to provide a radar comparatively immune to jamming by swept, barrage type jammers.

An additional object of the present invention is to provide a radar which will accept a single comparatively strong signal at a moment when other confusing signals have faded and which will ignore plural signals having comparatively equal strength.

Still another object of the present invention is to present to the operator of a radar a visual indication of the position of extreme targets in multiple target formation.

Other objects and many of the attendant advantages of this invention will be readily appreciated as the same becomes better understood by reference to the following detailed description when considered in connection with the accompanying drawings, wherein:

Figure 1:
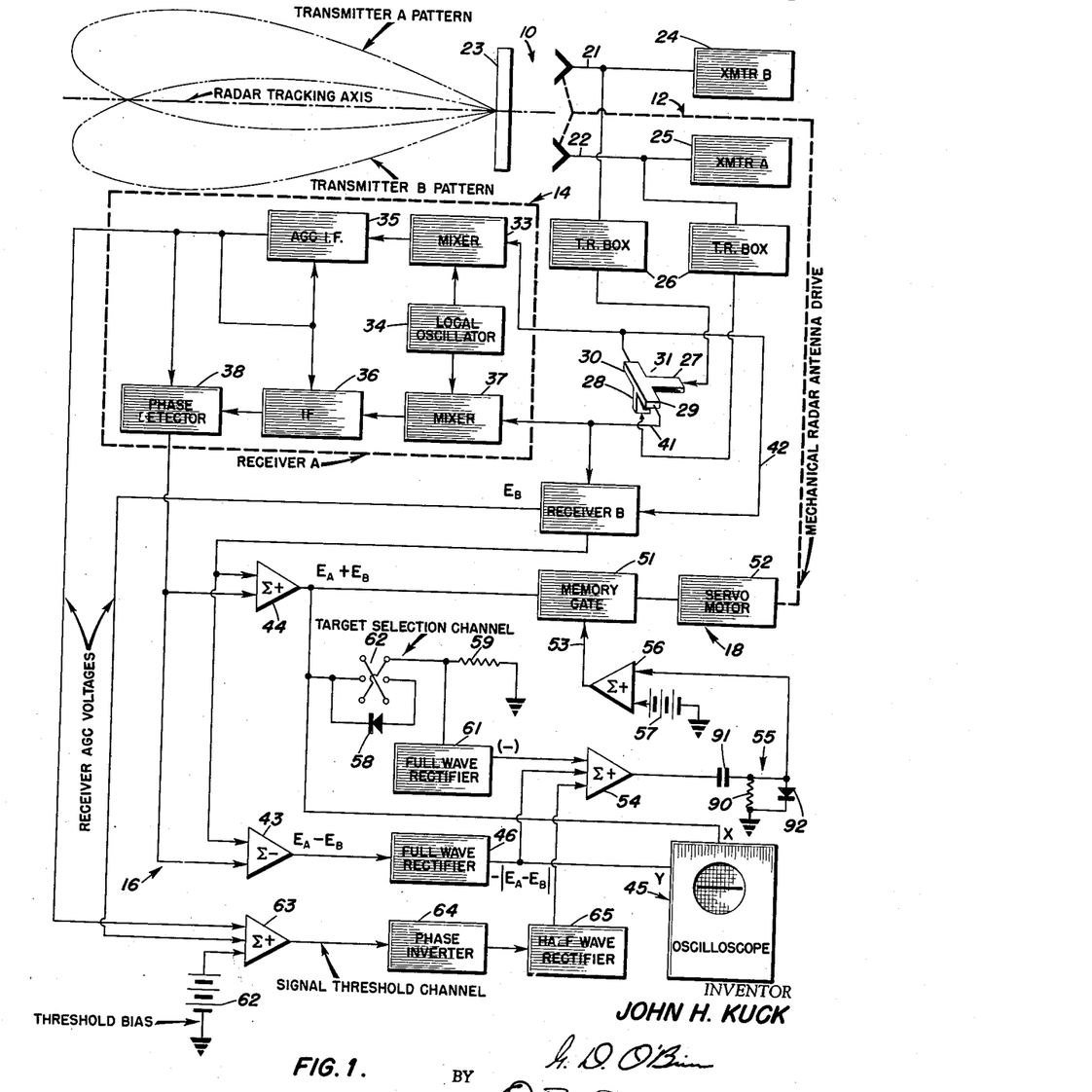
FIG. 1 is a functional block diagram of one embodiment of the apparatus of the present invention.

Referring to the drawings and particularly to FIG. 1 thereof, the means of the invention comprises generally the combination of an antenna array 10, transmitting apparatus 24—25, receiving apparatus 14, circuits 16 arranged for the detection of false errors, and a tracking servo 18. While the components of the invention are later considered in detail, their function will be better appreciated by first briefly considering some of the theoretical aspects of the problem created by multiple targets confronting a radar, and the method of solving the problem conceived of in the present invention.

Figure 2:
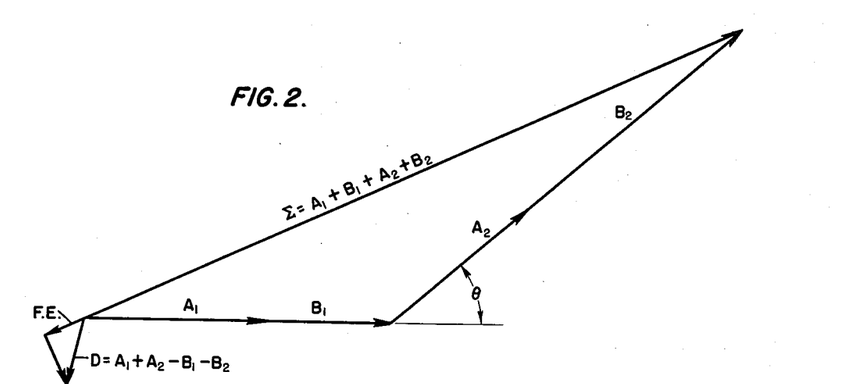
FIG. 2 is a vector diagram of the voltages received by a radar from a pair of targets in formation.
Figure 3:
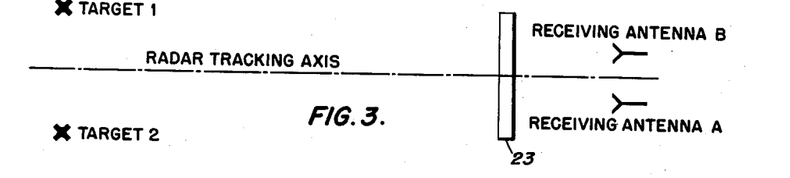
FIG. 3 is a diagram illustrating the position of the targets with respect to the radar tracking axis.

In FIG. 2 a vector diagram is drawn of the voltages received by a monopulse radar from a pair of separated targets. The radar is normally equipped with two pairs of horn type receiving antennas, one pair providing azimuth error signals. For simplicity, only a single plane, say the azimuth, will be considered. The targets and antennas are shown schematically in FIG. 3.

The monopulse radar provides tracking error signals by means of the following operations. The difference between the signals in antenna A and antenna B is obtained. The difference signal is divided by the sum of the signals in antennas A and B through the action of an automatic gain control circuit, and phase detected with respect to the sum signal. Automatic gain control removes fluctuations in the error signal due to target noise, while the phase detection adds sense, i.e., direction, to the error signal output. A single target is therefore indicated by an error voltage proportional to the difference signal and whose polarity indicates whether the target lies left or right of the radar axis.

If multiple targets exist, false error signals F.E. are developed as indicated in FIG. 2. Vectors $A_1$ and $B_1$ represent the signals in horns A and B respectively from target 1. Vectors $A_2$ and $B_2$ represent the signals in horns A and B respectively from target 2. The signals from target 2 appear in random phase $\theta$ with respect to target 1. The phase angle $\theta$ results from a slight difference in the ranges—i.e., a fraction of a wavelength of the transmitted frequency, of targets 1 and 2 from the radar. The monopulse radar performs the operations previously described to provide the sum signal vector S and the difference signal vector D. The error signal supplied the tracking circuit is proportional to the component of the difference signal in phase with the sum signal. As will be seen, this component does not correctly represent the error between the radar tracking axis and either of the targets. Moreover, the error signal output bears neither a constant phase nor a constant amplitude relationship with the true errors to either of the targets, since the reflectivities of the two targets and their phase is a random function.

Figure 4:
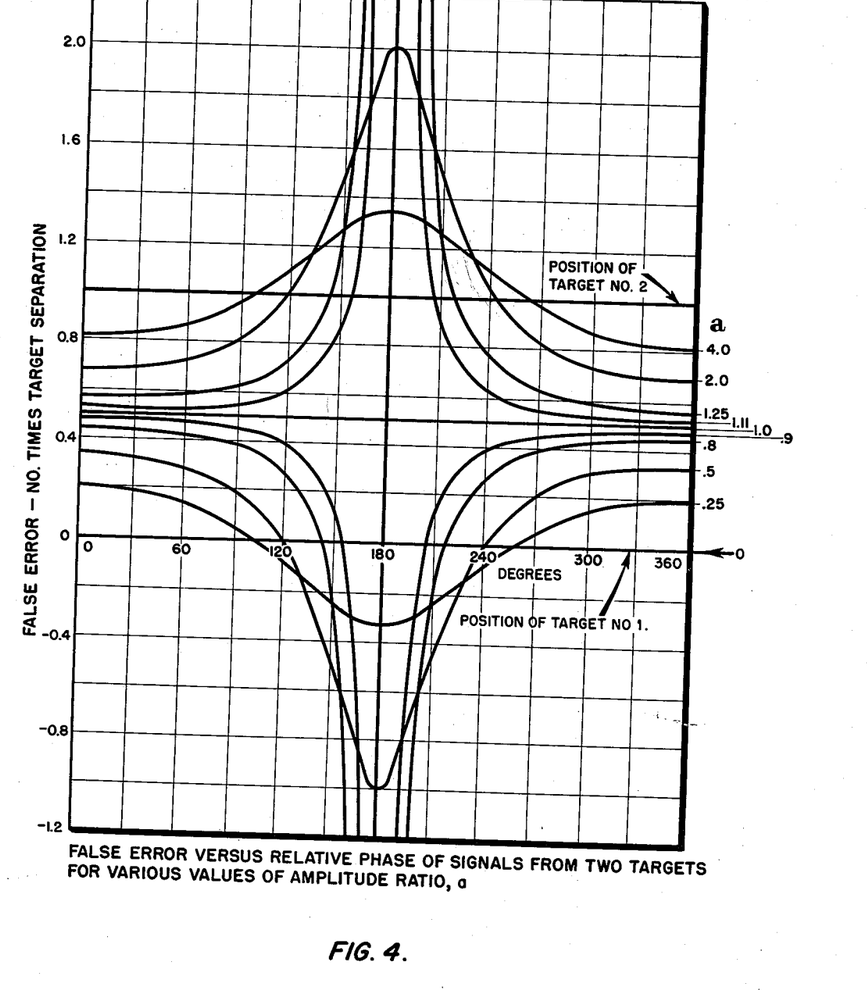
FIG. 4 is a chart illustrating the theoretical values of the false error generated by a pair of targets for various phase and reflectivity values.

Based upon certain simplifying asumptions, principally that the radar possesses linear antenna patterns, it is possible to compute the false error outputs of the radar, and these are plotted in FIG. 4. The false error is defined as the difference between the error signal actually obtained and the true error signal that would be obtained if only the desired target were present. The false error is plotted in normalized units along the ordinate for various values of phase angle $\theta$. The family of curves is derived from the assumption of various ratios of the reflectivity of target 2 with respect to target 1. The curves are general in that the false error is independent of the direction the radar points with respect to the targets.

Choosing as a particular case for discussion the curve $a=1.25$, it will be seen that a false error of approximately 0.6 the target separation exists for in phase targets. Therefore, although the radar is correctly pointed at target 1, it would shift its position to point approximately midway between the targets. As the phase difference between the targets increases, the false error increases and approaches infinity for phase values close to 180 degrees. However, the relative reflectivities and phase angles fluctuate in random fashion, so that the entire region bounded by the curves is an indication of the pointing likely to be obtained. It can thus be seen that in the case of two targets a monopulse system would during the majority of time direct the radar between the two targets, practically insuring a miss.

According to the method of the present invention, two independent error voltages are obtained, each of which contains information of the location of the multiple targets. Although the information of target location cannot be extracted from one of the error voltages alone, a pair of error voltages obtained closely in point of time possesses sufficient correlation to enable the determination of the location of either target of a pair or the location of outer targets in a formation of more than two targets. Correlated error voltages are obtained by illuminating the targets with radiation of distinct intensity ratios. The error voltages are maintained separate either by a time modulation process, or by utilizing signals of different frequency.

The apparatus illustrated in FIG. 1 possesses two distinct antenna patterns. One pattern designated as A, is skewed to the right of the radar tracking axis, and the other pattern, B, is skewed to the left. Therefore, targets located to the right of the tracking axis will be more intensely illuminated by radiation transmitted by channel A, while targets located to the left of the tracking axis will be more intensely illuminated by the radiation transmitted by channel B.

The independent error voltages are $E_A$, developed in channel A and $E_B$, developed in channel B. The radar antenna array 10 comprises four horn type antennas, only two of which, 21 and 22, are shown. The four horns are grouped symmetrically, with two lying in the elevation plane and two lying in the azimuth plane. Only one plane, i.e. the azimuth, is considered here since the apparatus for the elevation plane is essentially a duplicate of that illustrated. A microwave lens 23 positioned ahead of horns 21 and 22 focusses the energy emitted by horn 22 into antenna pattern lobe A and the energy emitted by horn 21 into antenna pattern lobe B. Horns 21 and 22 are energized by separate transmitters 24 and 25, operating on separate frequencies. Antennas 21 and 22 are connected through TR boxes 26 to the input arms 27 and 28 of a magic T type hybrid junction 31. The difference between the signals in antennas 21 and 22 appears in arm 29 of junction 31. The sum of the signals in antennas 21 and 22 appears in arm 30 of junction 31. The sum signal is passed into a mixer 33 where it is combined with an output signal from a local oscillator 34. The output of mixer 33 is amplified in an A.G.C. amplifier 35 and provides gain control both for itself and for a second IF amplifier 36. The difference signal from arm 29 of junction 31 is reduced to the intermediate frequency of amplifier 36 by the combination of an output from local oscillator 34 therewith in a second mixer 37. The action of amplifier 35 in controlling the gain of itself and amplifier 36 is nearly instantaneous so that the output of amplifier 36 is proportional to the quotient of the difference signal divided by the sum signal. The phase angle between the sum and difference signals is introduced by the action of a phase detector 38 which provides an output equal to the component of the output of amplifier 36 in phase with the output of amplifier 35.

The output of amplifier 35 is the error voltage, $E_A$, which is the output of receiver A, and may be expressed as $$E_A \alpha \left| \frac{E_{21A} - E_{22A}}{E_{21A} + E_{22A}} \right| \cos \psi_A \qquad (1)$$

where $E_{21A}$ is the voltage induced in antenna 21 having the frequency of transmitter A;
$E_{22A}$ is the voltage induced in antenna 22 having the frequency of transmitter A, and
$\psi_A$ is the phase angle between the voltages $E_{21A}$ and $E_{22A}$.

The error voltage output of receiver B is developed in the same manner as is the error voltage output of receiver A. The bandwidth of antennas 21 and 22 and junction 31 is adequate to accommodate simultaneously the frequency separated signals of transmitters A and B and it is therefore unnecessary that these components be duplicated. Waveguides 41 and 42 connected to arms 29 and 30 supply the sum and difference signals appearing therein to the inputs of receiver B which is closely matched in gain and phase shift characteristics to receiver A. Receiver B may utilize the output of local oscillator 34 for reducing the signals of transmitter B to an intermediate frequency, in which event the intermediate frequency of receiver B will differ from that of receiver A, or a separate local oscillator may be provided.

The error voltage output $E_B$ of receiver B may be expressed as $$E_B \alpha \left| \frac{E_{21B} - E_{22B}}{E_{21B} + E_{22B}} \right| \cos \psi_B \qquad (2)$$

Correlation exists between the $E_A$ and $E_B$ error voltages. For example, assuming target 1, to the right of the tracking axis, to be momentarily a considerably stronger reflector than target 2, then the situation reduces itself to the single target case and the $E_A$ and $E_B$ error voltages will be equal and the difference therebetween will be zero. If targets 1 and 2 were equally strong reflectors, the right skewed antenna lobe of channel A would provide an $E_A$ voltage corresponding effectively to the error voltage obtained in a conventional monopulse radar when the right hand target is the stronger reflector. Similarly the left skewed lobe of channel B provides an error voltage $E_B$ corresponding to the conventional monopulse radar output when the left hand target is the stronger reflector. As may be seen from FIG. 2, the error voltages $E_A$ and $E_B$ will be different in such a case and the difference between the two will be other than zero. Therefore, the occurrence of zero difference between error voltages $E_A$ and $E_B$ can be utilized as an indication that the derived error signals pertain to only one of the targets and may be accepted as an accurate indication of the deviation of the tracking axis from that target.

Figure 5:
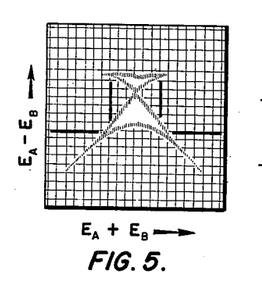
FIG. 5 illustrates an oscilloscope presentation of the error signals of a pair of targets as provided by means of the present invention.

For manual direction of the radar the difference between the error voltage outputs ($E_A-E_B$), obtained in a difference amplifier 43, is applied to the $y$ axis input of an oscilloscope 45 and the sum of the error voltage outputs ($E_A+E_B$), obtained in a summing network 44, is applied to the $x$ axis input thereof. The resultant display is illustrated in FIG. 5. As may be shown by analysis of the data presented in FIG. 4, the points defined by the intersection of the $x$ axis and the parabola shaped curve forming the lower boundary of the display, correctly indicate the locations of each target of a pair. For purposes of clarity, the $x$ axis and the locations of the targets producing the displays of FIGS. 5, 6 and 7 have been emphasized by heavy lines.

Figure 6:
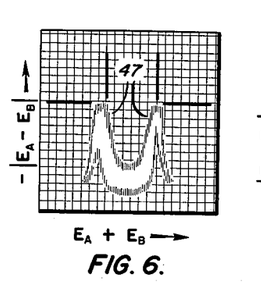
FIG. 6 illustrates an oscilloscope presentation of the signals of a pair of targets as provided by means improved over those of FIG. 5.
Figure 7:
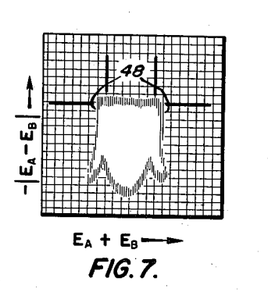
FIG. 7 illustrates an oscilloscope presentation of the error signals from three targets as provided by the means utilized in FIG. 6.

In order to facilitate recognition of the target locations and to enable automatic tracking of a single target of a pair, as will later be described, the difference voltage output ($E_A-E_B$) of amplifier 43 is passed through a full wave rectifier 46 arranged to provide outputs of negative polarity. The oscilloscope display will then appear as is illustrated in FIG. 6. The inner edges 47 of the peaks in FIG. 6 indicate the locations of the targets. If three targets appear in formation, it has been experimentally determined that the display pattern illustrated in FIG. 7 will result. The outer edges 48 of the display pattern of FIG. 7 mark the outer target of the formation and the operator would therefore direct the radar toward those points.

In automatically tracking a target, use is made of a controlled memory gate arranged to block all incoming signals except at such times as the blocking criterion, i.e., the difference error voltage ($E_A-E_B$), indicates reliable error voltages by its equality to zero.

The radar antenna servo 52 may be either an entirely electrical system or electro-hydraulic system and includes the usual power amplifier, actuator and mechanical transmission for positioning the radar antenna mount.

The error voltage sum signal ($E_A+E_B$) is applied to the memory gate 51 which either conducts the sum signal to the input of servo 52 or blocks the sum signal according to the polarity of a gate control signal applied through lead 53. The gate 51 is opened, i.e., rendered conductive, upon the appearance of a positive gate control signal. The arrangement illustrated is designed therefore to produce negative gate control signals upon the appearance of undesirable or confusing error signals. Positive gate control signals are then produced upon the appearance of error signals containing reliable target information. In addition, the gate 51 provides a memory function by maintaining the signal level to the servo 52 at that value which represents the last reliable error signal passed by the gate. Thus, if the gate 51 is opened through action of the gate control signal on lead 53, the input to servo 52 will be retained at its previous level, insuring against de-activation of the servo and consequent wandering of the radar. This memory gate takes several forms well-known in the prior art.

A summing network 54 receives the rectified difference signal $-(E_A-E_B)$, the output of rectifier 46 providing a negative polarity signal, and the rectified output of a selected polarity of the error voltage sum signal $$(E_A+E_B)$$

The output of summing network 54 is applied to a D.C. restorer 55, which performs a function to be described hereinafter, and thence to another summing network 56. In summing network 56, the output of D.C. restorer 55 is added to a positive gate bias voltage from a battery 57, or other suitable source. Since a positive gate control signal is required to render gate 51 conductive, normally any negative output of summing network 54 greater than the voltage output of battery 57 would render the gate nonconductive. As will be recalled, the error signal voltage difference ($E_A-E_B$) must be zero for reliable target information to exist, and at such times it is possible for the sum error signal voltage ($E_A+E_B$) to be either positive or negative according to whether the right or left hand target is momentarily the strong reflector. The rectified difference error signal $-(E_A-E_B)$ cannot be used alone for controlling the operation of the gate 51 since that voltage would be zero whenever the undesired target is momentarily the primary reflector as well as whenever the desired target is the primary reflector.

A target selection channel provides a voltage output to be applied to network 54 to block the gate at such times as the undesired target may be the primary reflector. The target selection channel includes a half wave rectifier 58 arranged to be inserted in series with the sum error signal ($E_A+E_B$), a shunting resistor 59 and a full wave rectifier 61, the output of which is applied to summing network 54. The rectifier 58 may be connected to pass either polarity of the applied signal by means of a reversing switch 62, and whatever the polarity of the passed signal, it will be converted to negative, gate blocking signals in rectifier 61. Signals having the polarity of the undesired target signal are passed in rectifier 58. Thus, whenever the difference error signal ($E_A-E_B$) is zero and the undesired target is the primary reflector, a sufficient voltage will be developed by rectifier 61 to render the gate 51 nonconductive.

If in tracking a desired target, say one to the right, the radar should overshoot so that the desired target would be then to the left, the desired target signals would be of the opposite polarity and the desired error signals would be blocked as well as the undesired error signals. Thus there would be no restoring force to bring the radar back toward the center of the formation and the gate would remain blocked indefinitely. The D.-C. restorer 55, however, prevents such operation by blocking steady D.-C. voltages with a resistor 90-capacitor 91 coupling circuit. Therefore, even though the potential at the output of network 54 remains negative, the potential across resistor 90 gradually returns toward zero due to the charging of capacitor 91. However, the potential of the peaks of the signal is no longer accurately set at zero. Normally, the capacitor 91 charges toward an average potential such that peaks would occur at a positive level after the radar has been stationary for a relatively long period of time. Thus the gate would be held conducting too long.

However, such action is prevented by a rectifier 92 shunted across resistor 90. As soon as capacitor 91 has discharged through resistor 90 to a potential sufficiently low to permit a signal peak to cause a positive output, the rectifier conducts and effectively short circuits positive potentials across resistor 90. A charge is then accumulated on capacitor 91 to cause closely following peaks indicating the desired target to occur at approximately zero potential. The D.C. restorer 55 therefore insures that the gate will be conductive for certain minimum and maximum periods of time and permits the radar to reorient itself toward the target formation until it again tracks normally.

A signal threshold channel is provided to block gate 51 whenever the level of the input signals to receivers A and B falls below an acceptable threshold value. The ouput of the A.G.C.-I.F. amplifier 35 in receiver A, and the output from the similar amplifier in receiver B, together with a threshold bias voltage from a battery 62, or other suitable source, are added in a summing network 63. The A.G.C. voltages are of negative polarity and when combined exceed the magnitude of the threshold bias voltage for signals of acceptable strength and fall below the threshold bias for inacceptable signal strengths. The output of summing network 63 is therefore negative for acceptable signal strengths and positive for inacceptable signal strengths. The polarity of the output signal of summing network 63 is reversed in a phase inverter 64, the output of which is applied to a half wave rectifier 65. Rectifier 65 is arranged to pass signals of negative polarity and to block signals of positive polarity. Therefore, should the signals received from the targets fade to an inacceptable level, the rectifier 65 will apply a negative voltage to summing network 54 to render gate 51 nonconductive and thus prevent the radar from wandering haphazardly.

The invention has been described as it is embodied in apparatus utilizing frequency separation between transmitted signals to provide the desired correlated error signals. The frequency separation must not be too great lest the correlation be destroyed due to target reflectivities at different frequencies differing in phase and amplitude. Correlated error signals may also be obtained through apparatus employing time modulation processes. The latter apparatus is advantageous in that it enables the use of a single receiver and thereby eliminates the problem of obtaining fairly closed matched receivers. Time modulation also eliminates the aforementioned problem of decorrelation due to reflectivity changing with frequency. It is disadvantageous to the extent that it complicates measuring the range to a target because it introduces additional range ambiguity and in that an almost instantaneously acting automatic gain control detector is required.

Figure 8:
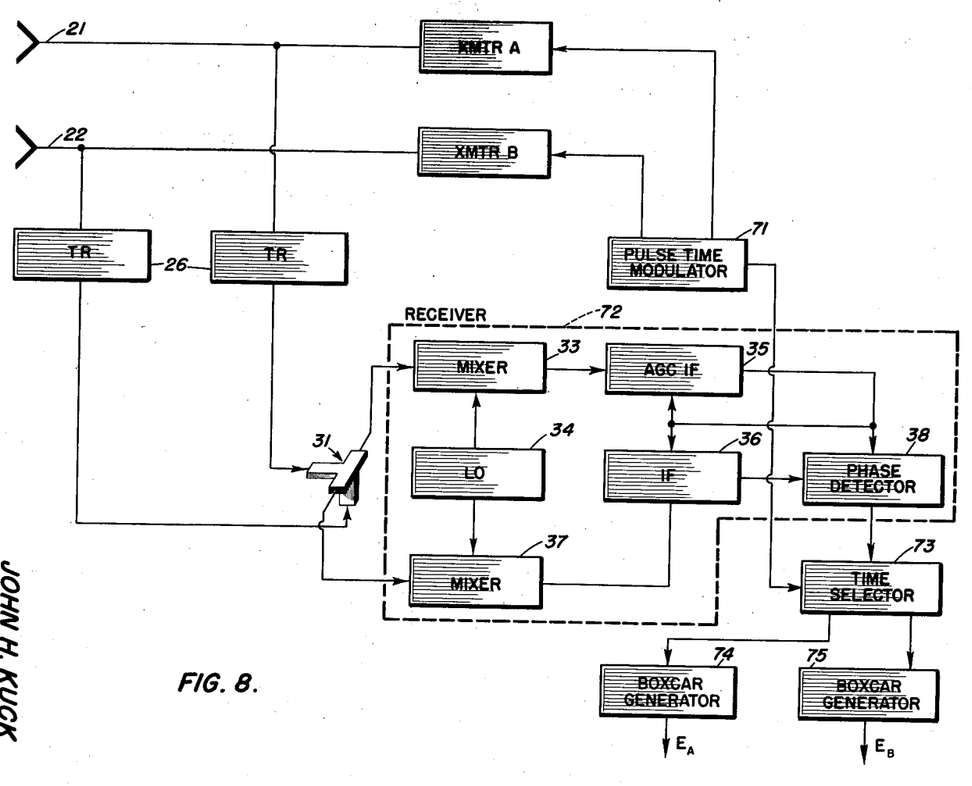
FIG. 8 is a functional block diagram of another embodiment of the present invention.

FIG. 8 illustrates an embodiment of the invention employing time modulation means. Transmitters A and B are connected to horns 21 and 22 in the same manner as previously described with reference to FIG. 3. The transmitters are tuned to the same frequency and are arranged to transmit during separate time intervals as controlled by a pulse time modulator 71. The receiver 72 is similar in operation and construction to receiver A of FIG. 3. However, special precautions must be taken to insure that the speed of response of the A.G.C. circuit of receiver 72 is adequate to maintain separation of the pulses from transmitters A and B. The phase detected outputs of receiver 72 are isolated from one another in a time selector 73, synchronized with pulse time modulator 71, and applied to boxcar generators 74 and 75 to provide the correlated error signals $E_A$ and $E_B$. The sum and difference of the $E_A$ and $E_B$ voltages are then employed in the manner previously described for manual or automatic tracking of multiple targets.

Figure 9:
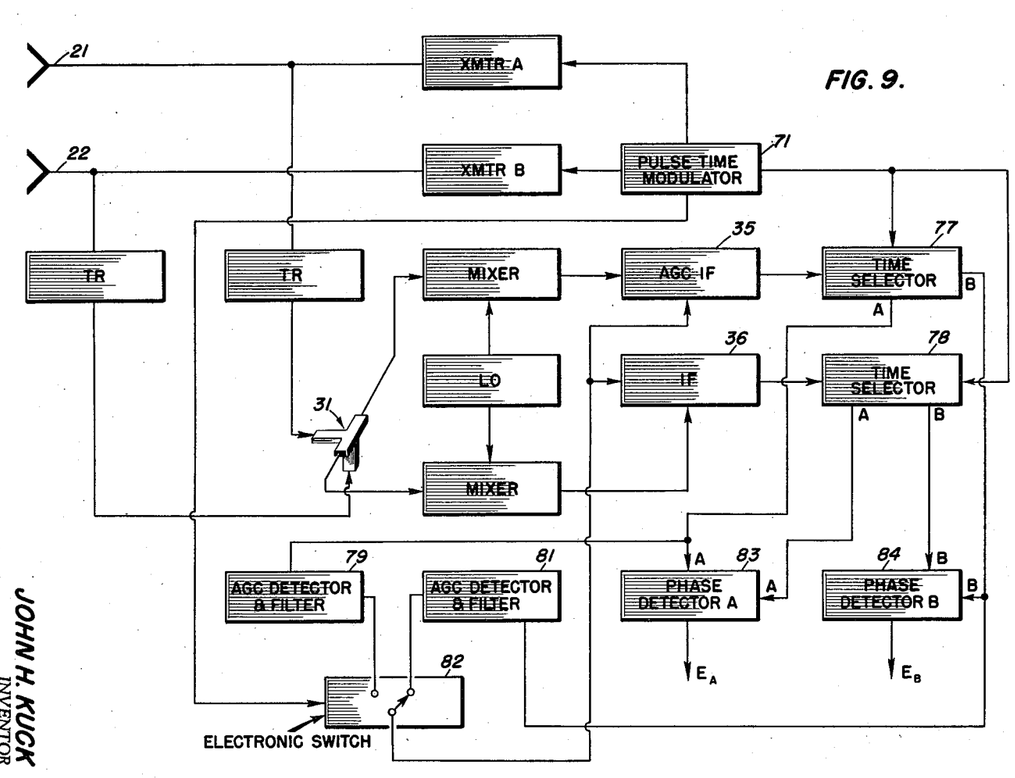
FIG. 9 is a functional block diagram of still another embodiment of the present invention.

FIG. 9 illustrates apparatus employing time modulation to derive the correlated error voltages $E_A$ and $E_B$ which does not require instantaneously responsive automatic gain control as does the circuit of FIG. 8. The circuit of FIG. 9 differs from the circuit of FIG. 8 in the positioning of the time selectors 77 and 78 at the outputs of I.F. amplifiers 35 and 36 rather than at the output of the phase detector 38.

The outputs of amplifiers 35 and 36 are isolated by the time selectors 77 and 78 into A and B pulses in synchronism with the order of transmission of pulses from the A and B transmitters. Time selector 77 provides the A and B A.G.C. voltages which are detected and filtered in separate detectors 79 and 81. An electronic switch 82 controlled by delayed pulses from the modulator 71 selects the output from the appropriate one of the detector filter combinations 79 or 81, according to the pulse being received, and applies the selected A.G.C. voltage to amplifiers 35 and 36.

While it will be seen that the A.G.C. voltage need not respond to pulse level variations, as in the embodiment of FIG. 8, the response of I.F. amplifiers 35 and 36 to the commutated A.G.C. output of the electronic switch 82 must be very nearly instantaneous. It is thus insured that the gain of the I.F. amplifiers is actually a function of the separate A and B A.G.C. voltages, and the accurate separation of the correlated error voltages will be maintained.

Separate phase detectors 83 and 84 are provided for detecting the component of the A output of time selector 78 in phase with the A output of time selector 77 and thus producing the $E_A$ error voltage. Similarly, by detecting the component of the B output of time selector 78 in phase with the B output of time selector 78 in phase with the B output of time selector 77, the $E_B$ error voltage is produced. The correlated error voltages $E_A$ and $E_B$ are then combined in the manner previously described for effecting either manual or automatic tracking of multiple targets.

The present invention offers improved performance over prior radars in tracking targets taking certain countermeasures against the radar. An anticipated countermeasure comprises the provision of "twinkling" or sweeping jammers on multiple targets flying in formation. The radar would then in effect see different targets in quick succession, as jammers on the various targets were switched on and off in a random fashion or as different frequency sweeping jammers came successively within the pass-band of the radar receiver. The confusion produced in the radar error circuits would then be similar to the confusion introduced by the normal multiple target problem, although more complicated in a different aspect, because the jammers radiate energy continuously, rendering range gating circuits ineffective to resolve the targets.

While the means of the present invention cannot aid in resolving the targets by range resolution, the false error detecting circuits 16 enable the radar to continue to track target bearings. A monopulse radar, if properly designed, should be able to track passively the bearing of the jamming signal from a single jammer. However, if multiple targets are present at different angles and each one is carrying a jammer, then the multiple target problem exists, even though the targets may be at different ranges.

As previously mentioned, it is probable that jammers will be turned on and off rapidly in a random fashion or swept in frequency in a random fashion in order that the radar will not be able to track any one target long enough to locate it accurately.

Under such conditions, the target selection channel of FIG. 1 in conjunction with memory gate 51 should permit the radar to track either the right or left-hand extremity of a formation as designated by the operator with the aid of selection switch 62. If the radar is tracking a signal radiated from the right-hand extremity, for instance, and this signal suddenly disappears and another signal far to the left suddenly appears, the resultant negative error signal from the target selection channel would block gate 51 and the tracking loop would ignore this undesired signal for a period of time determined by the discharge time constant of the D.C. restorer 55.

Thus if the jamming signal from the desired target reappeared before the discharge of D.C. restorer 55, the angle tracking performance would be improved over ordinary radars. These advantages are available employing the target selection channel, D.C. restorer 55, and memory gate 51 alone. Only one receiver is required and the summing network 43 and rectifier 46 may be eliminated.

Obviously many modifications and variations of the present invention are possible in the light of the above teachings. It is therefore to be understood that within the scope of the appended claims the invention may be practiced otherwise than as specifically described.

What is claimed is:

1. In a radar, apparatus for tracking multiple target formations, comprising, means for transmitting electromagnetic energy distributed in a plurality of separated lobes, means for receiving energy reflected from plural targets within the separated transmission lobes, means for deriving from said received energy a plurality of error voltages, means for separating said error voltages with respect to the particular transmitted lobe whence the received energy originated, a normally nonconductive memory gate receiving at least one of said separated error voltages, a servomotor controlled by the output of said memory gate for altering the pointing of the radar antenna, means for comparing the amplitudes of at least a pair of said separated error signals, and means for rendering said memory gate conductive upon the appearance of equal amplitude signals in said comparing means.

2. A radar comprising, a first transmitter, a second transmitter, a directive antenna receiving the outputs of said first and second transmitters and arranged to focus the output energy of said first transmitter into a first lobe skewed in one direction and to focus the output energy of said second transmitter into a second lobe skewed in the opposite direction from said first lobe, said first and second lobes being overlapped in part to constitute the tracking axis of said antenna, means for receiving energy reflected by plural targets within said lobes, means for identifying said received energy according to the lobe of its origin, means for deriving from said separated received energy first and second error signals respectively identified with said first and second antenna lobes, means providing the difference between said first and second error signals, a servo for changing the direction of pointing of said antenna, said servo normally being controlled by said first and second error signals, and means blocking the application of said first and second error signals to said servo upon the appearance of an output from said difference means.

3. A radar as claimed in claim 2, wherein said first and second transmitters are tuned to separate frequencies thereby constituting said means for identifying said recieved energy according to the lobe of its origin.

4. A radar as claimed in claim 2, wherein said means for identifying said received energy according to the lobe of its origin comprises the combination of a time modulator with said first and second transmitters and a time demodulator with said receiving means.

5. A radar for automatically tracking a single target with a multiple target formation, comprising, a first transmitter, a second transmitter, a directive antenna including a first radiating element receiving the output of said first transmitter and a second radiating element receiving the output of said second transmitter, a hybrid junction including a pair of input arms and a pair of output arms, and first radiating element being coupled to one of said input arms and said second radiating element being coupled to the other of said input arms, a first receiver receiving its inputs from the output arms of said junction and providing a first error voltage output, a second receiver receiving its inputs from the output arms of said junction and providing a second error voltage output, a servo for controlling the pointing of said antenna and actuable by at least one said error voltages, and means controlling the conduction of said one of said error voltages to said servo to prevent servo operation upon the appearance of a difference in value of said first and said second error voltages.

6. Apparatus as claimed in claim 5 with additionally, means combined with said last named means to block the conduction of a selected polarity of said one of said error voltages.

7. A radar for automatically tracking a single target within a multiple target formation, comprising, a first transmitter, a second transmitter, a directive antenna including a first radiating element receiving the output of said first transmitter and a second radiating element receiving the output of said second transmitter, a pulse time modulator controlling the alternate transmission of said first transmitter and said second transmitter, a receiver including input means connected to said first and second radiating elements to provide as receiver inputs the sum and difference of the signals received by said first and second radiating elements, said receiver providing an output proportional to the absolute value of the component of the quotient of said sum and difference input signals in phase with said sum input signal, a time selector receiving the output of said receiver and synchronized with said pulse time modulator to separate said receiver output into first and second correlated error voltages, a servo for controlling the pointing of said antenna and actuable by at least one of said error voltages, and means controlling the conduction of said one of said error voltages to said servo to prevent servo operation upon the appearance of a difference in value of said first and said second error voltages.

8. Apparatus as claimed in claim 7 with additionally, means combined with said last named means to block the conduction of a selected polarity of said one of said error voltages.

9. A radar for automatically tracking a single target within a multiple large formation, comprising, a first transmitter, a second transmitter, a directive antenna including a first radiating element receiving the output of said first transmitter and a second radiating element receiving the output of said second transmitter, a pulse time modulator controlling the alternate transmission of said first transmitter and said second transmitter, means connected to said first and second radiating elements to provide the sum of signals received by said first and second radiating elements and to provide the difference in signals received by said first and second radiating elements, first variable gain means for amplifying said sum, second variable gain means for amplifying said difference, a first time selector receiving the output of said first amplifying means and synchronized with said pulse time modulator to provide first and second sum output voltages respectively identifiable with energy transmitted by said first and second transmitters, a second time selector receiving the output of said second amplifying means and synchronized with said pulse time modulator to provide first and second difference output voltages respectively identifiable with energy transmitted by said first and second transmitters, a first gain control detector receiving said first sum output voltage, a second gain control detector receiving said second sum output voltage, an electronic switch for applying the output of said first gain control detector to said first and second amplifying means to control the gain thereof during reception of energy transmitted by said first transmitter and for applying the output of said second gain control detector to said first and second amplifying means to control the gain thereof during reception of energy transmitted by said second transmitter, a first phase detector for detecting the component of said first difference output voltage in phase with said first sum output voltage thereby providing a first error voltage, a second phase detector for detecting the component of said second difference output voltage in phase with said second sum output voltage thereby providing a second error voltage, a servo for controlling the pointing of said antenna and actuable by at least one of said error voltages to said servo to prevent servo operation upon the appearance of a difference in value of said first and said second error voltages.

10. Apparatus as claimed in claim 9 with additionally, means combined with said last named means to block the conduction of a selected polarity of said one of said error voltages.

11. In a radar providing at least a pair of correlated error voltages for the purpose of tracking target formations, said radar including a servo actuable by at least one of said error voltages for altering the pointing of the radar antenna; a false error blocking circuit comprising, a gate for controlling the application of error voltage to said servo, said gate being rendered nonconductive by the application of a control voltage of a particular polarity, means for obtaining the difference between said pair of error voltages, first rectifying means for converting said difference into the particular polarity of control voltage rendering said gate nonconductive, means providing the sum of said error voltages, means for blocking a selected polarity of said error voltage sum and for passing error voltage sums opposite said selected polarity, second rectifying means receiving said passed error voltage sums for converting the same into the particular polarity of control voltage rendering said gate nonconductive, and means providing the sum of the outputs of said first and second rectifying means, the output of said last named means constituting the control voltage of said gate.

12. A device as claimed in claim 11, with additionally means interposed between said gate and said last named means for reducing within a selected time the amplitude of outputs of said last named means to prevent said gate from being rendered nonconductive indefinitely.

13. A device as claimed in claim 12, with additionally means sensitive to the strength of signals received by said radar to apply to said first and second rectifier summing means a signal of the particular polarity of control voltage rendering said gate non-conductive.

References Cited in the file of this patent

UNITED STATES PATENTS

| | | |
|---|---|---|
| 2,597,349 | Longmire | May 20, 1952 |
| 2,659,883 | Haake | Nov. 17, 1953 |
| 2,682,656 | Phillips | June 29, 1954 |
| 2,709,804 | Chance | May 31, 1955 |
| 2,759,154 | Smith | Aug. 14, 1956 |
| 2,760,189 | McCoy | Aug. 21, 1956 |

OTHER REFERENCES

Aeronautical Engineering Review, published May 1952; pp. 71 to 73 relied on.